(12) United States Patent
Fujita et al.

(10) Patent No.: US 8,387,008 B2
(45) Date of Patent: Feb. 26, 2013

(54) METHOD FOR SHARING A FUNCTION BETWEEN WEB CONTENTS

(75) Inventors: Takeshi Fujita, Tokyo (JP); Tsutomu Kawachi, Tokyo (JP)

(73) Assignee: Sony Corporation, Tokyo (JP)

( * ) Notice: Subject to any disclaimer, the term of this patent is extended or adjusted under 35 U.S.C. 154(b) by 1169 days.

(21) Appl. No.: 12/251,870

(22) Filed: Oct. 15, 2008

(65) Prior Publication Data

US 2009/0083707 A1    Mar. 26, 2009

Related U.S. Application Data

(60) Provisional application No. 60/980,559, filed on Oct. 17, 2007.

(30) Foreign Application Priority Data

Apr. 1, 2005  (JP) ................................. 2005-106644

(51) Int. Cl.
*G06F 9/44* (2006.01)

(52) U.S. Cl. ........................................................ 717/115
(58) Field of Classification Search .................. 717/115
See application file for complete search history.

(56) References Cited

U.S. PATENT DOCUMENTS

2006/0130034 A1* 6/2006 Beisiegel et al. ............. 717/166

* cited by examiner

*Primary Examiner* — Chun-Kuan Lee
(74) *Attorney, Agent, or Firm* — K&L Gates LLP

(57) ABSTRACT

When an execution request for a predetermined function occurs when a content associated with a certain frame is executed, a definition of the function for which execution is requested is searched for in the content. When the definition of the function is not found in the content, the definition of the function is searched for until the definition of the function is found in a content associated with a parent frame of the frame associated with the content in which the definition has not been found. When the definition of the function is found, predetermined processing is executed based on the found definition of the function.

12 Claims, 18 Drawing Sheets

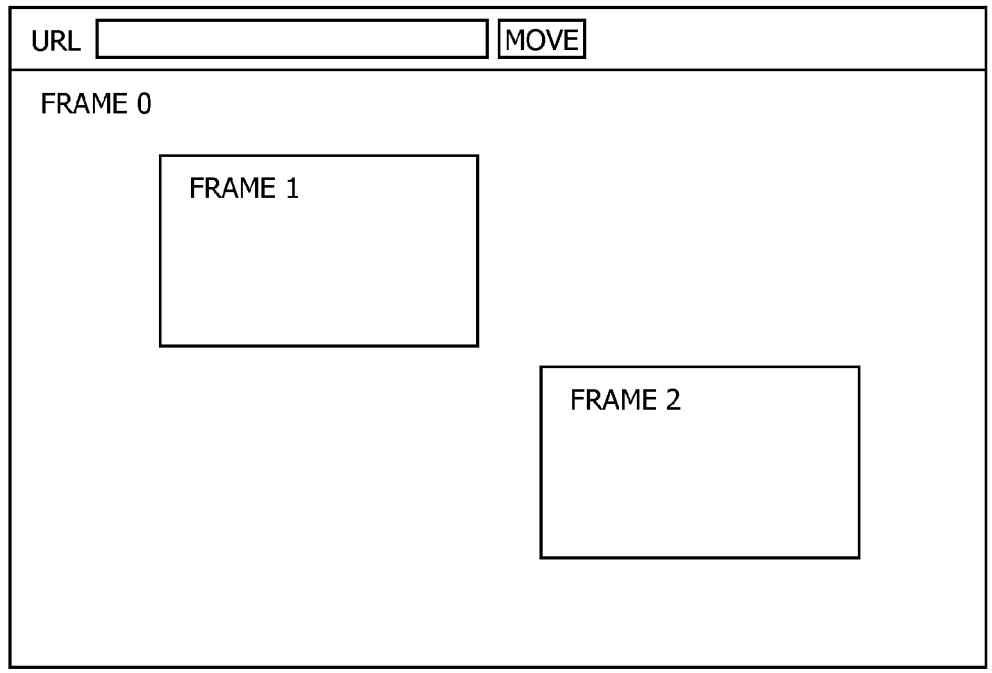

FIG. 16

RAM

| FRAME IDENTIFIER | CONTENT |
|---|---|
| FRAME 0 | WEB PAGE 0<br>`var g_n_=0;`<br>`function set(v){`<br>` g_n=v;`<br>`}`<br>`function get(){`<br>` return g_n;`<br>`}` |
| FRAME 1 | WEB PAGE 1<br>FUNCTION UTILIZATION PROGRAM |
| FRAME 2 | WEB PAGE 2<br>FUNCTION UTILIZATION PROGRAM |
| FRAME A | WEB PAGE A<br>`function get(){`<br>` return 999;`<br>`}` |

| FRAME IDENTIFIER | FRAME IDENTIFIER OF PARENT FRAME |
|---|---|
| FRAME 1 | FRAME 0 |
| FRAME 2 | FRAME A |
| FRAME A | FRAME 0 |

FIG. 17

```
<!DOCTYPE HTML PUBLIC
  "-//W3C//DTD HTML 4.01 Transitional//EN"
  "http://www.w3.org/TR/html4/loose.dtd">
<html>

<head>
  <meta http-equiv="Content-Type" content="text/html; charset=utf-8">
  <meta http-equiv="Content-Style-Type" content="text/css">
  <title>index.html</title>
<script language="JavaScript">
<!--
function funcC(e,st) {
 e.value = st + ' executed by FuncC on index.html';
}
function funcE(e,st) {
 e.value = st + ' executed by FuncE on index.html';
}
//-->
</script>
<style type="text/css">
html, body {
 background-color: #ccffcc;
}
</style>
</head>

<body>
<div>
 <div id = 'filename'>This is index.html.</div>
 <iframe src="ko.html" name="index" width = '700' height = '500'>
</div>
</body>
</html>
```

FIG. 18

```
<!DOCTYPE HTML PUBLIC
  "-//W3C//DTD HTML 4.01 Transitional//EN"
  "http://www.w3.org/TR/html4/loose.dtd">
<html>

<head>
  <meta http-equiv="Content-Type" content="text/html; charset=utf-8">
  <meta http-equiv="Content-Style-Type" content="text/css">
  <title>ko.html</title>
<script language="JavaScript">
<!--
function funcA(elem,st1,st2) {
//IT IS NOT EXECUTED BECAUSE IT IS NOT OBTAINED
 e.value = st1 + " " + st2 + ' executed by FuncA on ko.html';
}
function funcB(e,st) {
 e.value = st + ' executed by FuncB on ko.html';
}
//-->
</script>
<style type="text/css">
html, body {
 background-color: #ccccff;
}
</style>

</head>

<body>
<div>
 <div id = 'filename'>This is ko.html.</div>
 <iframe src="mago.html" name="index" width = '640' height = '400'>
</div>
</body>
</html>
```

FIG. 19

```
<?xml version="1.0" encoding="utf-8"?>
<!DOCTYPE HTML PUBLIC "-//W3C//DTD HTML 4.01 Transitional//EN"
  "http://www.w3.org/TR/html4/loose.dtd">
<html>
<head>
  <title>mago.html</title>
  <meta http-equiv="content-type" content="text/html; charset=utf-8">
<script language="JavaScript">
<!--
var e; var ipt1; var ipt2;
function doOnLoad() {
 e = document.getElementById('res');
 ipt1 = document.getElementById('ipt1');
 ipt2 = document.getElementById('ipt2');
}
function funcA(elem,st1,st2) {
 elem.value = st1 + " _ " + st2 + ' executed by FuncA on mago.html';
}
function exefunc(w,funname,argAry){
 var f = findfuncbyname(w,funname);
 if(f) { f.apply(null,argAry);
 } else { alert('function not found in this window or parents');
 }
 function findfuncbyname(w,f) {
  var func;
  //METHOD 1-OBTAIN FUNCTION AS ASSOCIATIVE ARRAY OF WINDOW
  // (PASS FUNCTION NAME AS STRING)
  if (!w) w = window;
  while (w) {
   if(w[f] && typeof(w[f]) == 'function') { return w[f]; }
   if (w == top) { return null; }
   w = w.parent;
  }
/* //METHOD 2-SEARCH BY eval FUNCTION
  if (!w) w = 'window';
  func = eval(w + '.' + f);
  if (func) { return func;
  } else {
    if (eval(w) != top) {
     w += '.parent';
     return findfuncbyname(w,f);
    } else { return null; }
  } */
 }
}
}
```

FIG. 20

```
function f_A() { exefunc("","funcA",arguments); }
function f_B() { exefunc("","funcB",arguments); }
function f_C() { exefunc("","funcC",arguments); }
function f_D() { exefunc("","funcD",arguments); }
function funcE() {
 var st = arguments.callee.toString();
 var stFunc = "function";
 var iFm = st.indexOf(stFunc,0);
 var iTo = st.indexOf("(",iFm);
 var iLen = stFunc.length;
 st = st.substr(iFm + iLen + 1, iTo - iFm - iLen -1);
 exefunc(window.parent,"funcE",arguments); //CASE OF METHOD 1
// exefunc('window.parent',"funcE",arguments); //CASE OF METHOD 2
}
//-->
</script>
</head>
<body onload='doOnLoad()'>
 <div id = 'filename'>This is mago.html.</div>
 <div id = 'func1' onclick='f_A(e,ipt1.value,ipt2.value)'>
WHEN THIS CHARACTER STRING IS CLICKED,
FUNCTION funcA IS SEARCHED FOR AND EXECUTED
</div><br>
 <div id = 'func2' onclick='f_B(e,ipt1.value)'>
WHEN THIS CHARACTER STRING IS CLICKED,
FUNCTION funcB IS SEARCHED FOR AND EXECUTED
</div><br>
 <div id = 'func3' onclick='f_C(e,ipt2.value)'>
WHEN THIS CHARACTER STRING IS CLICKED,
FUNCTION funcC IS SEARCHED FOR AND EXECUTED
</div><br>
 <div id = 'func4' onclick='f_D(e,ipt1.value,ipt2.value)'>
WHEN THIS CHARACTER STRING IS CLICKED,
FUNCTION funcD IS SEARCHED FOR
BUT IS NOT EXECUTED BECAUSE IT IS NOT FOUND
</div><br>
 <div id = 'func5' onclick='funcE(e,ipt1.value+ipt2.value)'>
WHEN THIS CHARACTER STRING IS CLICKED,
EXECUTED FUNCTION funcE GOES TO PARENT FRAME,
SEARCHES FOR DEFINITION AND EXECUTES IT
</div><br>
 <input id = 'ipt1' value='hello'><br>
 <input id = 'ipt2' value='world'><br>
 <input id = 'res' size="60" value='THIS IS RESULT DISPLAY AREA'><br>
</body>
</html>
```

FIG. 24

RAM

| FRAME IDENTIFIER | DEFINITION OF FUNCTION |
|---|---|
| FRAME 0 | funcA(x)=x |
| FRAME 1 | funcA(x)=x |
| FRAME 2 | funcA(x)=x+1 | ns
METHOD FOR SHARING A FUNCTION BETWEEN WEB CONTENTS

REFERENCE TO RELATED APPLICATION

This application claims priority to U.S. Provisional Patent Application No. 60/980,559, filed Oct. 17, 2007, the disclosure of which is incorporated herein by reference.

BACKGROUND OF THE INVENTION

1. Field of the Invention

The present invention relates to use of a function of which a definition is described in one of a plurality of contents associated with a plurality of frames having a parent-child relationship.

2. Description of the Related Art

A terminal device can divide a screen of a web browser into a plurality of frames, generate a child frame in a screen and display on each frame a web page received from an external information providing system. Web pages (such as, for example, an HTML file or a DHTML file) displayed on these frames can include a program described in a predetermined script language such as JavaScript (registered trademark). The terminal device interprets and executes this program by a web browser and displays a GUI (Graphical User Interface) thereof or the like on a predetermined frame.

In this case, when a predetermined operation is detected by the GUI of a predetermined program (for example, a program providing a calculator function, or the like) displayed on a frame and an execution request of a predetermined function is generated, the terminal device performs predetermined processing based on the definition of a function described in a web page including this program.

In this manner, even when the definition of a function used in a certain frame is changed, it does not affect a function used in other frames. That is, the definition of a function can be changed and used independently in each frame.

On the other hand, as another aspect, the definition of a function used in each frame can be stored in an external file such as a js file, and the stored definition of a function can be used in frames. In this way, the terminal device downloads the js file from the external information providing system according to a "<script>" tag described on a web page displayed on each frame. Then the terminal device associates the definition of a function in the downloaded js file with a frame identifier identifying the frame displaying the web page in which the "<script>" tag is described, and stores them in a memory device such as a RAM.

Here, when the definition of a function with the same name as a function stored in the js file is described in the web page in which the "<script>" tag is described, the terminal device associates the definition of the function in this web page with the frame identifier corresponding to the frame displaying this web page and stores them in a memory device such as a RAM.

FIG. 24 is a diagram conceptually showing information stored in a RAM as a memory device when, for example, a js file in which the definition of a function "funcA(x)=x" is described is specified by "<script>" tags of web pages to be displayed on a frame 0, a frame 1, and a frame 2, and the definition of a function "funcA(x)=x+1" is described on a web page to be displayed on the frame 2.

When a predetermined user operation is detected by a GUI displayed on a frame and an execution request of a predetermined function is generated, the terminal device performs predetermined processing based on the definition of a function associated with the frame identifier corresponding to the frame; and the definition of a function and the frame identifier are stored in the RAM.

SUMMARY OF THE INVENTION

However, in the above example, it is difficult to share a function among a plurality of frames.

The present invention is made in view of the above-described problem, and an object thereof is to make it possible to share a function by a plurality of frames and to redefine and use the definition of this function independently in each frame as necessary. To solve the above-described problem, the present invention provides as follows.

A method of using a function according to the present invention includes the steps of: when an execution request for a predetermined function occurs when a content associated with a certain frame is executed, searching in the content for a definition of the function for which execution is requested; when the definition of the function is not found in the content, searching for the definition of the function until the definition of the function is found in a content associated with a parent frame of the frame associated with the content in which the definition has not been found; and when the definition of the function is found, executing predetermined processing based on the found definition of the function.

Further, a method of using a function according to the present invention may be provided as follows in addition to the above-described method of using a function. Specifically, the method of using a function further includes the steps of: associating a frame identifier identifying a frame and a content associated with the frame, and storing them in a predetermined storage device; and associating the frame identifier and a frame identifier of a parent frame of the frame with the frame identifier and, storing them in the predetermined storage device. Then, when identifying the content associated with the parent frame of the frame associated with the content in which the definition has not been found, a frame identifier of the parent frame is identified, and a content associated with the frame identifier is identified as the content associated with the parent frame.

Further, the method of using a function according to the present invention may be provided as follows in addition to any one of the above-described methods of using a function. Specifically, the content includes a program described in a script language. Then the definition of the function is described in the program.

Further, the method of using a function according to the present invention may be provided as follows in addition to any one of the above-described methods of using a function. Specifically, the content has an external file including a program described in a script language. Then the definition of the function is described in the program. Accordingly, the definition of the function is searched for in the external file.

Further, the method of using a function according to the present invention may be provided as follows in addition to any one of the above-described methods of using a function. Specifically, a function execution function, which takes a function name of a function to be executed and an argument thereof as arguments, is executed so as to search for the function to be executed and execute the function. The function execution function is a function which searches for a definition of a function based on the function name specified as an argument, and executes the function to be executed with an argument according to the found definition of the function.

Further, the method of using a function according to the present invention may be provided as follows in addition to any one of the above-described methods of using a function. Specifically, the script language is a language allowing to implicitly receive an argument without a definition of the argument and to use the argument in a function. Then the function execution function is executed by executing a function to call the function execution function so as to search for the function to be executed and execute the function. The function to call the function execution function is a function which receives an argument implicitly and specifies an argument of the function execution function explicitly as the implicitly received argument when the function execution function is called.

With a computer readable recording medium recording a function utilization program according to the present invention, when the function utilization program is executed by a processor, the processor executes the steps of: (a) when an execution request for a predetermined function occurs when a content associated with a certain frame is executed, searching in the content for a definition of the function for which execution is requested; (b) when the definition of the function is not found in the content, searching for the definition of the function until the definition of the function is found in a content associated with a parent frame of the frame associated with the content in which the definition has not been found; and (c) when the definition of the function is found, executing predetermined processing based on the found definition of the function.

Various other objects, advantages and features of the present invention will become readily apparent to those of ordinary skill in the art from the following detailed description of the invention.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 13 is a diagram in which a web page 0, a web page 1, and a web page 2 are displayed on the screen of a web browser in Example 1;

FIG. 14 is a diagram conceptually showing information stored in the RAM in Example 1;

FIG. 16 is a diagram conceptually showing information stored in the RAM in Example 2;

FIG. 17 is an example of a display control information of a web page 0 in Embodiment 4;

FIG. 18 is an example of a display control information of a web page 1 in Embodiment 4;

FIG. 19 is an example of a display control information of a web page 2 in Embodiment 4;

FIG. 20 is a continuation of the example of the display control information of the web page 2 in Embodiment 4;

FIG. 24 is a diagram conceptually showing information stored in a RAM in a conventional example.

DETAILED DESCRIPTION OF THE PREFERRED EMBODIMENTS

Hereinafter, an embodiment of the present invention will be explained with reference to the drawings.

Embodiment 1

Figure 1:
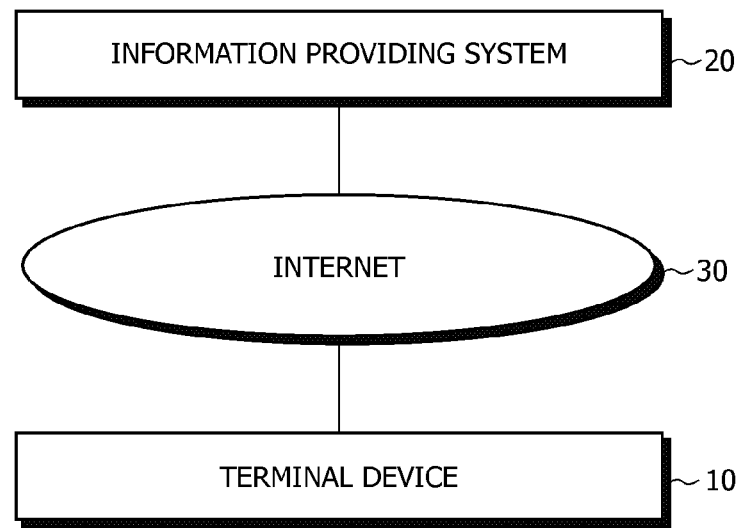
FIG. 1 is a block diagram showing an overall structure of a computer system.

FIG. 1 is a block diagram showing an overall structure of a computer system of this embodiment.

A terminal device 10 for browsing a content, and an information providing system 20 for providing a content are connected to the Internet 30 as a communication network. Here, only one terminal device 10 is connected to the Internet 30 in FIG. 1, but a plurality of terminal devices 10 may be connected to the Internet 30. Further, whether the connection between the terminal device 10 and the information providing system 20 to the Internet 30 is wired or wireless is not questioned.

Figure 2:
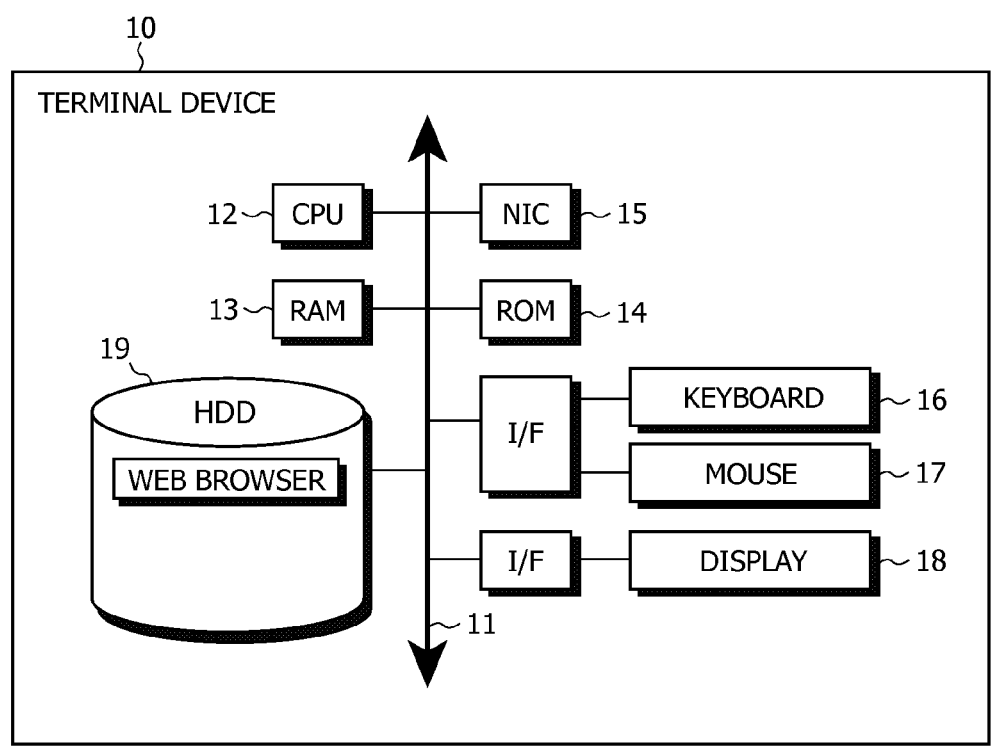
FIG. 2 is a structural diagram of a terminal device of Embodiment 1.

FIG. 2 is a structural diagram of the terminal device 10 of Embodiment 1.

A CPU 12 as a processing device, a RAM 13, a ROM 14, and an HDD 19 (Hard Disk Drive) as storage devices, a keyboard 16 and a mouse 17 as input devices, a display 18 as a display device and an NIC 15 (Network Interface Card) as a communication device are connected to a bus 11. In the HDD 19, a program of a typical web browser is stored. The CPU of the terminal device 10 is configured to display a web page or the like on the display as a content provided by the information providing system 20 by executing the program of the web browser. In this embodiment, as the terminal device 10, a general PC (personal computer) is adopted. However, it may be a PDA (Personal Digital Assistance), a cellular phone or the like having an Internet connection function.

Figure 3:
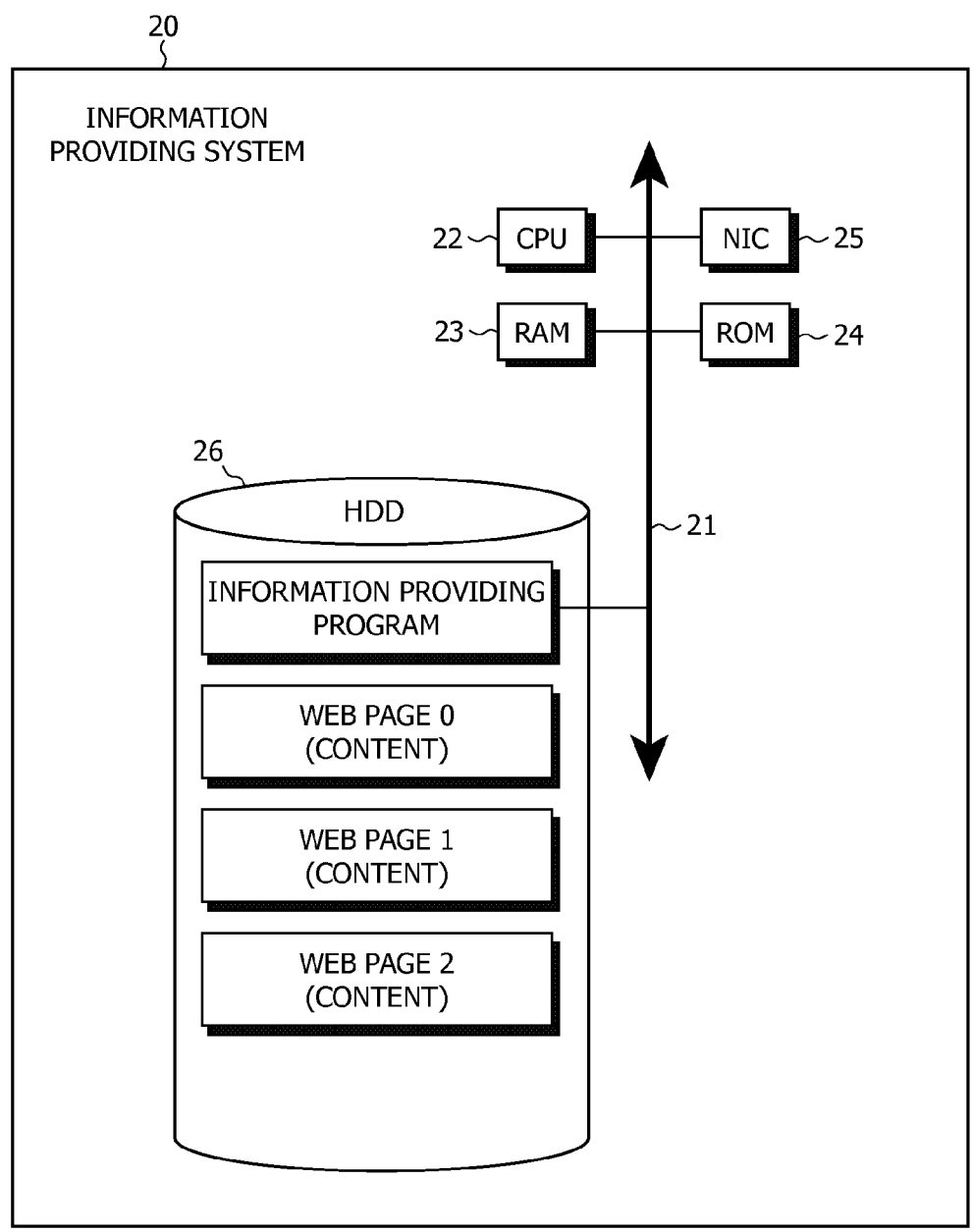
FIG. 3 is a schematic diagram of an information providing system.

FIG. 3 is a schematic diagram of the information providing system 20.

A CPU 22 as a processing device, a RAM 23, a ROM 24, and an HDD 26 as storage devices, and an NIC 25 (Network Interface Card) as a communication device are connected to a bus 21. In the HDD 26, an information providing program, and a web page 0, a web page 1 and a web page 2 as contents are stored. The CPU 22 provides the terminal device 10 with a content requested for a browse by executing the information providing program. As the information providing program, "Apache (registered trademark)", "IIS (registered trademark)", or the like is used.

Figure 4:
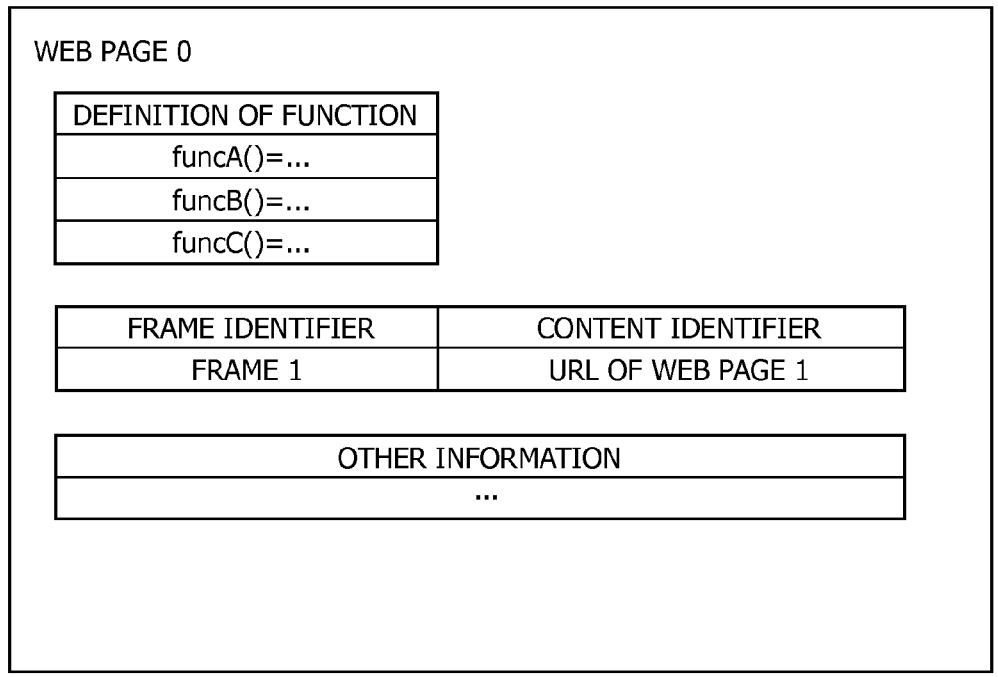
FIG. 4 is a structural diagram of a web page 0 (content)

FIG. 4 is a structural diagram of the web page 0 as a content.

In the web page 0, the definitions of functions (hereinafter referred to as common functions) used in a program (script) included in another web page are described. In FIG. 4, on the web page 0, the definitions of functions "funcA( )", "funcB( )" and "funcC( )" are described as common functions. Further, on the web page 0, a frame identifier identifying a frame and a content identifier identifying a content are described in association. As the frame identifier, a frame name or the like is used for example. Further, as the content identifier, a URL (Uniform Resource Locator) or the like is used for example. In FIG. 4, on the web page 0, a frame identifier "frame 1" and a content identifier "URL of web page 1" are described in association. Furthermore, on the web page 0, other information such as a text, an anchor, and so on constituting the web page are described. Here, the definitions of the common functions may be stored in a "js file" as an external file.

The CPU 12 of the terminal device 10 executes a web browser program, displays the web page 0 including the frame 1 based on the web page 0 received from the information providing system 20, and displays the web page 1 on this frame 1.

Figure 5:
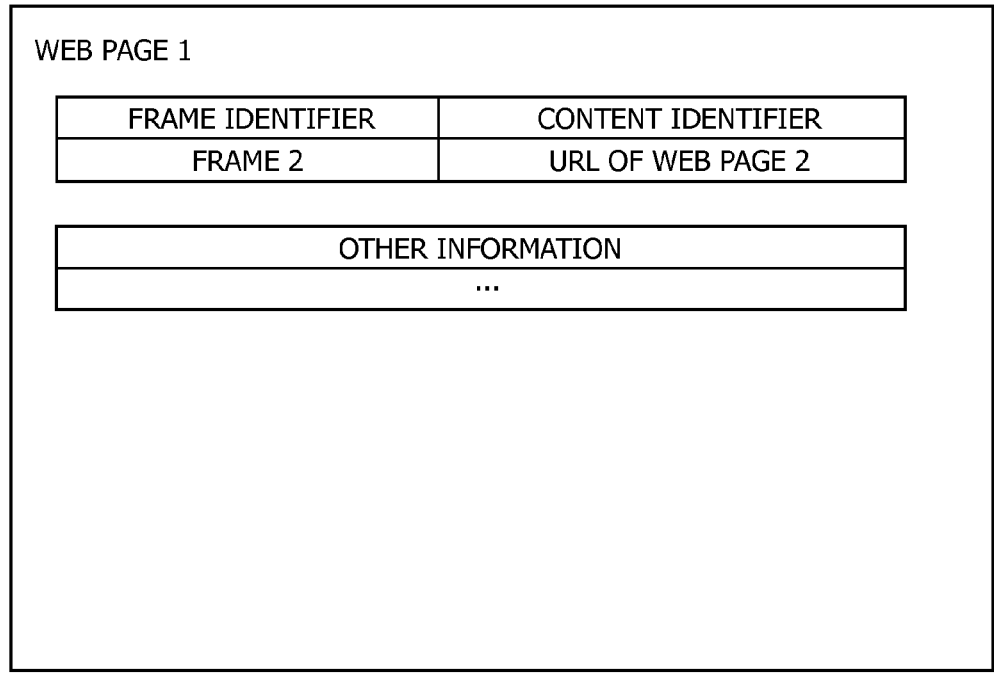
FIG. 5 is a structural diagram of a web page 1 (content)

FIG. 5 is a structural diagram of the web page 1 as a content. On the web page 1, a frame identifier "frame 2" and a content identifier "URL of web page 2" are described in association. Further, on the web page 1, other information such as a text, an anchor, and so on constituting the web page are described.

The CPU 12 of the terminal device 10 executes the web browser program, displays the web page 1 including the frame 2 based on the web page 1 received from the information providing system 20, and displays the web page 2 on this frame 2.

Figure 6:
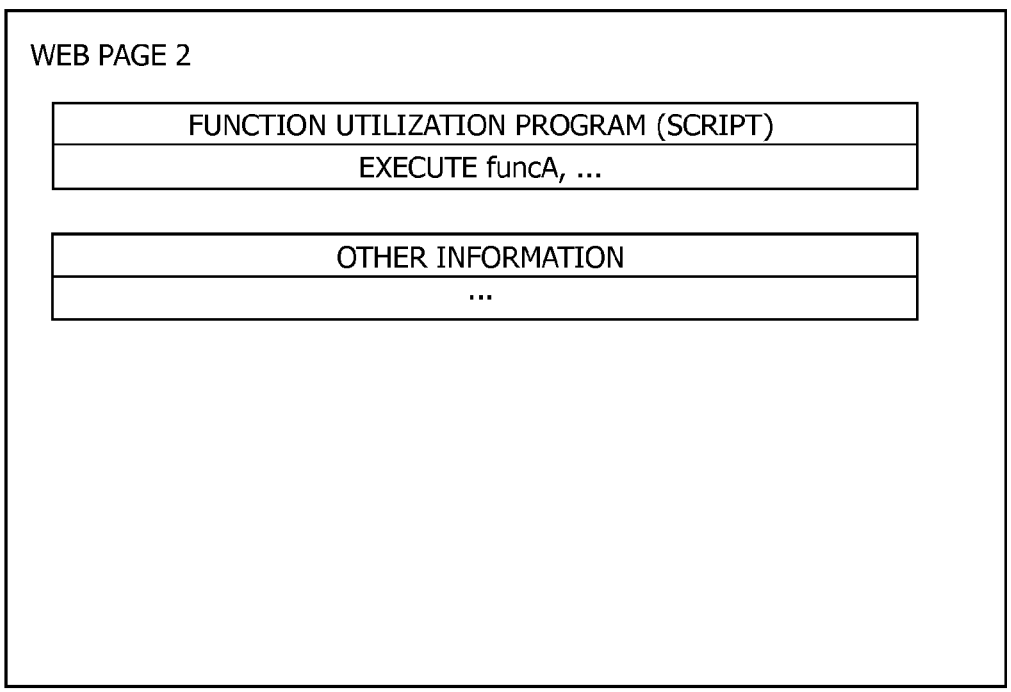
FIG. 6 is a structural diagram of a web page 2 (content)

FIG. 6 is a structural diagram of the web page 2 as a content.

On the web page 2, a function utilization program is described. In this embodiment, the function utilization program is described by a predetermined script such as Java Script (registered trademark). The CPU 12 of the terminal device 10 executes a predetermined function by executing the function utilization program via the web browser. Furthermore, on the web page 2, other information such as a text, an anchor, and so on constituting the web page are described.

The CPU 12 of the terminal device 10 executes the web browser program and displays a GUI of the function utilization program based on the web page 2 received from the information providing system 20.

In the following part, an operation of a computer system of this embodiment will be explained.

Figure 7:
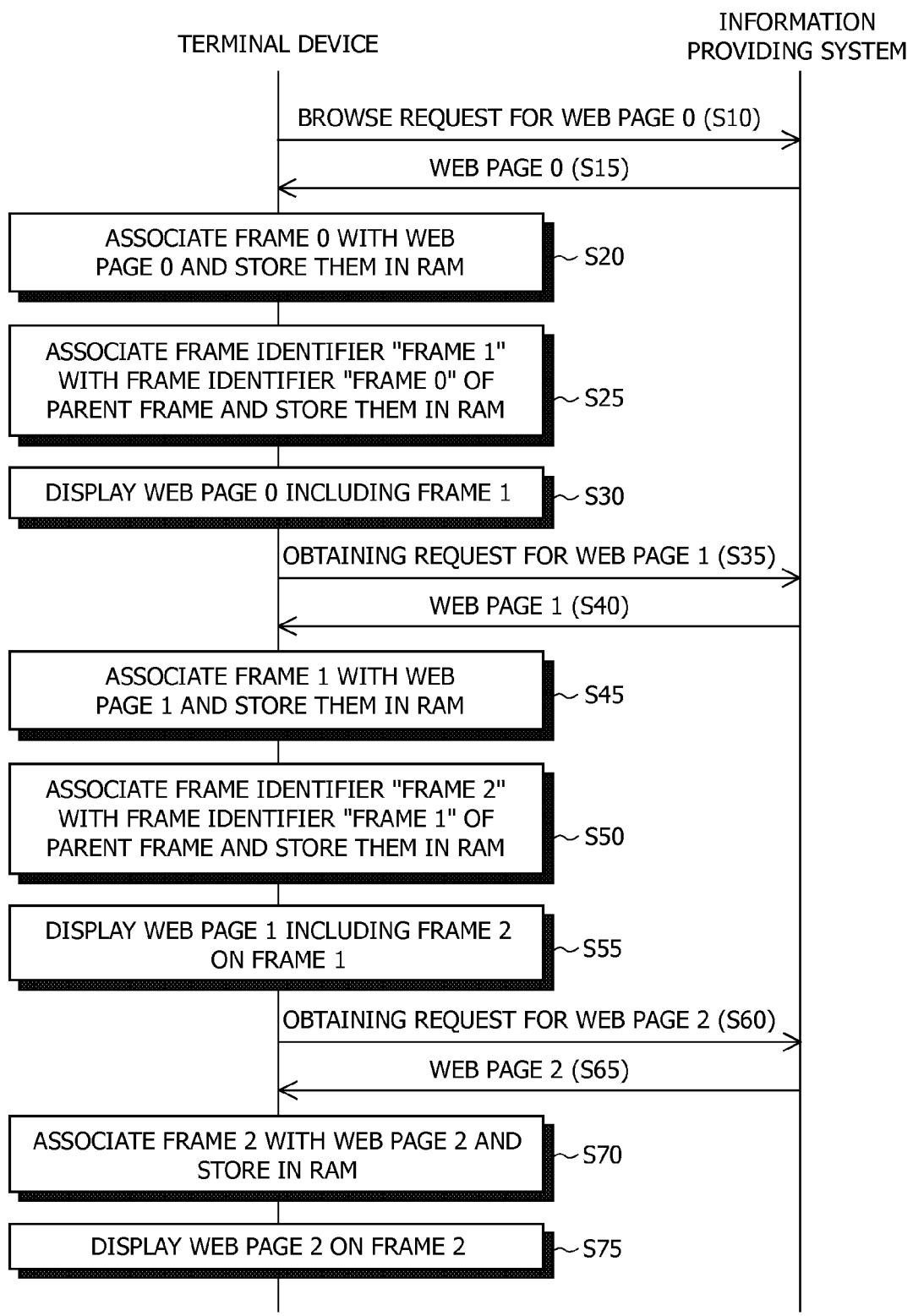
FIG. 7 is a flowchart showing operations of the terminal device and the information providing system when displaying a content.

FIG. 7 is a flowchart showing operations of the terminal device 10 and the information providing system 20 when displaying a content.

The CPU 12 of the terminal device 10 accepts a predetermined URL corresponding to the web page 0 from the keyboard. Then the CPU 12 transmits a browse request for the web page 0 to the information providing system 20 via the web browser based on the accepted URL (S10).

The CPU 22 of the information providing system 20 receives the browse request for the web page 0. Then the CPU 22 transmits the requested web page 0 to the terminal device 10 (S15).

The CPU 12 of the terminal device 10 receives the web page 0. Then the CPU 12 designates a frame identifier for the frame displaying the web page 0 as "frame 0", and associates this frame identifier with the web page 0 and stores them in the RAM 13 as a content storage area (S20). Further, the CPU 12 stores the received web page 0 in the HDD 19 as a cache file.

Furthermore, the CPU 12 of the terminal device 10 identifies a parent-child relationship between the frames based on the received web page 0. In this embodiment, the frame identifier "frame 1" is described on the web page 0. Further, the frame identifier "frame 0" is associated with the web page 0. Thus, the CPU 12 associates the frame identifier "frame 1" with the frame identifier "frame 0" of the parent frame, for which the frame 1 corresponding to the frame identifier "frame 1" is a child frame, and stores them in the RAM 13 (S25). Then the CPU 12 displays the web page 0 including the frame 1 on the display by the web browser (S30).

Subsequently, the CPU 12 of the terminal device 10 identifies a content identifier associated with a frame identifier in the web page 0, and transmits an obtaining request for the content corresponding to this content identifier to the information providing system 20. In this embodiment, since the frame identifier "frame 1" and the content identifier "URL of web page 1" are described in association in the web page 0, the CPU 12 transmits the obtaining request for the web page 1 to the information providing system 20 (S35).

The CPU 22 of the information providing system 20 receives the obtaining request for the web page 1. Then the CPU 22 transmits the web page 1 to the terminal device 10 (S40).

The CPU 12 of the terminal device 10 receives the web page 1. Then the CPU 12 reads the web page 0 from the RAM 13. The CPU 12 identifies the frame identifier in the web page 0 and the content identifier associated with the frame identifier, associates the frame identifier "frame 1" with the web page 1, and stores them in the RAM 13 as a content storage area (S45). Further, the CPU 12 stores the received web page 1 in the HDD 19 as a cache file.

Furthermore, the CPU 12 of the terminal device 10 identifies a parent-child relationship between the frames based on the frame identifier in the received web page 1 and the content identifier associated with this frame identifier. In this embodiment, the frame identifier "frame 2" is described in the web page 1. Further, the frame identifier "frame 1" is associated with the web page 1. Thus, the CPU 12 associates the frame identifier "frame 2" with the frame identifier "frame 1" of the parent frame, for which the frame 2 corresponding to the frame identifier "frame 2" is a child frame, and stores them in the RAM 13 (S50). Then the CPU 12 displays the web page 1 including the frame 2 on the frame 1 by the web browser (S55).

Subsequently, the CPU 12 of the terminal device 10 identifies a content identifier associated with a frame identifier in the web page 1, and transmits an obtaining request for the content corresponding to this content identifier to the information providing system 20. In this embodiment, since the frame identifier "frame 2" and the content identifier "URL of web page 2" are described in association on the web page 1, the CPU 12 transmits the obtaining request for the web page 2 to the information providing system 20 (S60).

The CPU 22 of the information providing system 20 receives the obtaining request for the web page 2. Then the CPU 22 transmits the web page 2 to the terminal device 10 (S65).

The CPU 12 of the terminal device 10 receives the web page 2. Then the CPU 12 reads the web page 1 from the RAM 13. The CPU 12 identifies the frame identifier in the web page 1 and the content identifier associated with the frame identifier, associates the frame identifier "frame 2" with the web page 2 and stores them in the RAM 13 as a content storage area (S70). Further, the CPU 12 stores the web page 2 in the HDD 19 as a cache file. Then the CPU 12 displays the web page 2 on the frame 2 by the web browser. Here, the CPU 12 displays a GUI of the function utilization program via the web browser based on the function utilization program (script) on the web page 2.

Figure 8:
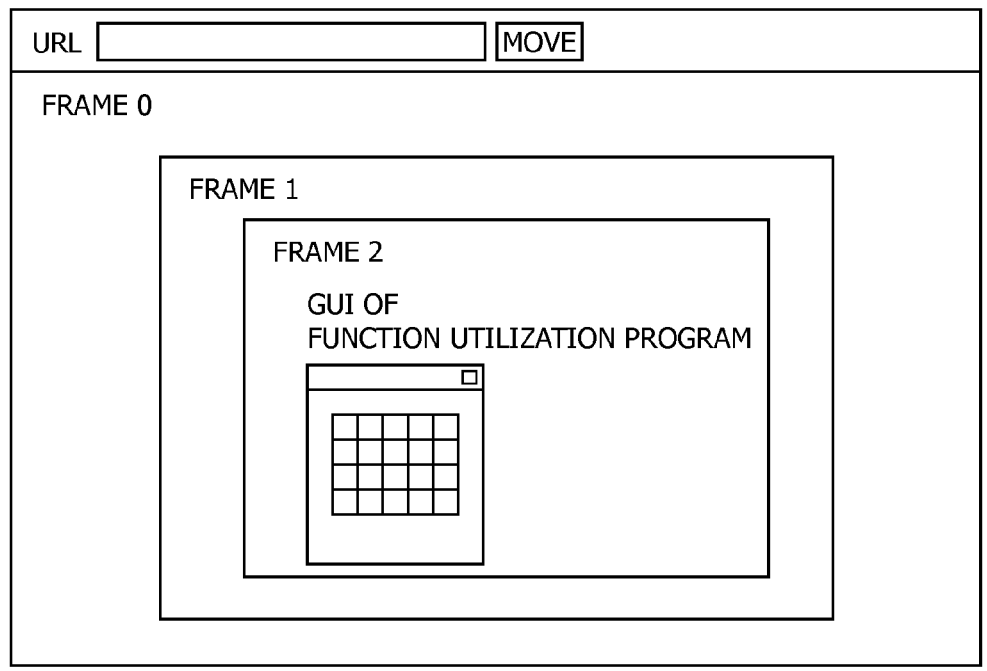
FIG. 8 is a diagram in which the web page 0, the web page 1 and the web page 2 are displayed on the screen of a web browser.
Figure 9:
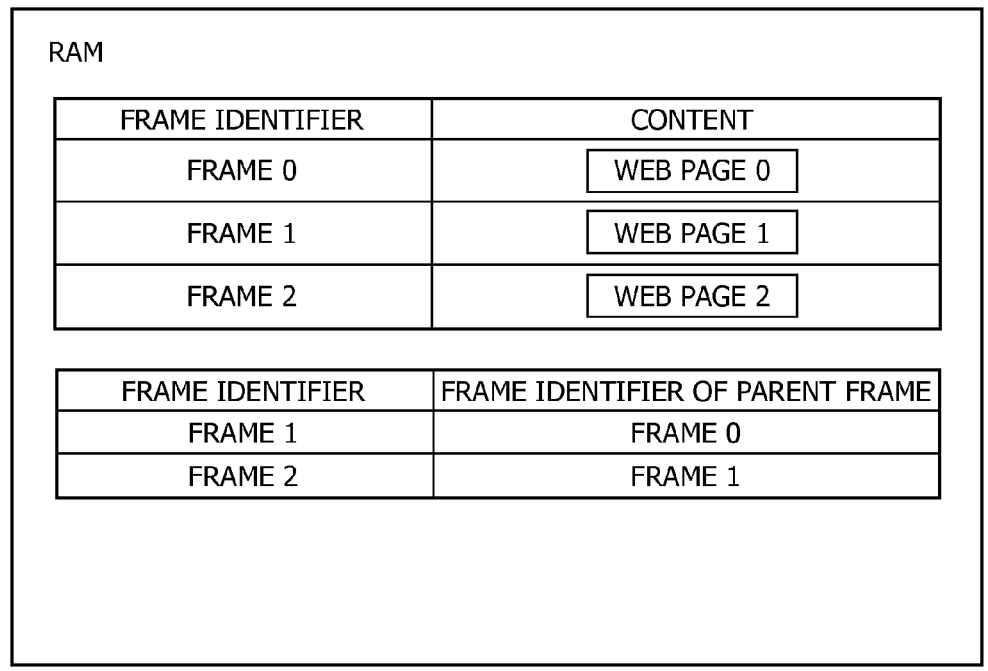
FIG. 9 is a diagram conceptually showing information stored in a RAM.

FIG. 8 is a diagram in which the web page 0, the web page 1 and the web page 2 are displayed on the screen of the web browser. Further, FIG. 9 is a diagram conceptually showing information stored in the RAM 13 after the aforementioned processing.

Figure 10:
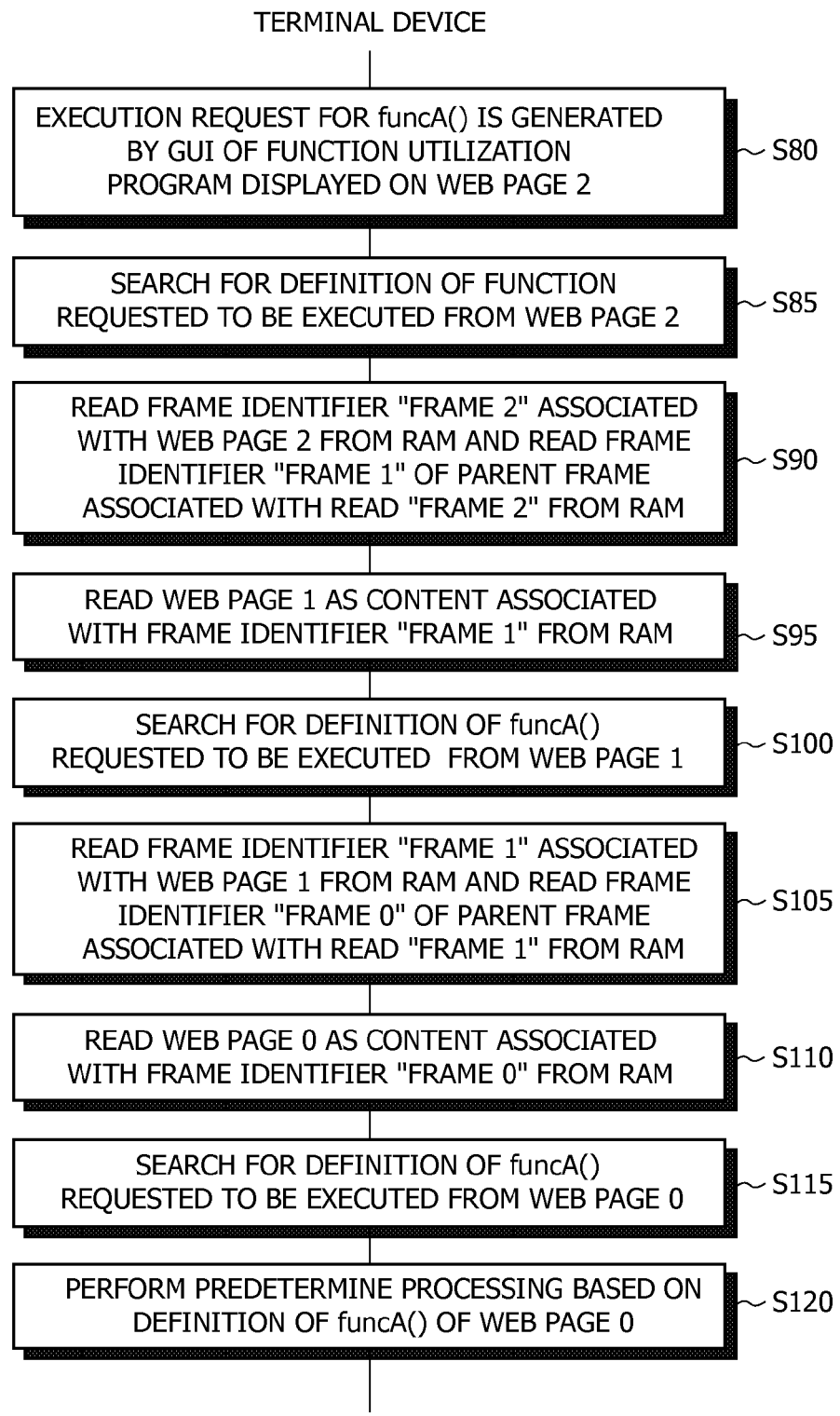
FIG. 10 is a flowchart showing an operation of the terminal device executing a function utilization program in Embodiment 1.

FIG. 10 is a flowchart of the terminal device 10 executing the function utilization program.

The CPU 12 of the terminal device 10 detects that a predetermined button on the GUI of the function utilization program of the web page 2 displayed on the frame 2 is clicked by a user operation with the mouse. Accordingly, an execution request for the function "funcA( )" occurs (S80). Here, it may be arranged such that the above execution request for the function occurs when an event is detected, such as an event related to an input device, a timer event, or an event on a web page as a content (for example, a JavaScript (registered trademark) kick from a Flash (registered trademark) or the like, or a completion of reading a web page displayed on a frame of IFRAME or the like). Then the CPU 12 searches in the web page 2 for the definition of the function "funcA( )" which is requested to be executed (S85). In this case, since the definition of the function "funcA( )" is not described on the web page 2, the CPU 12 reads the frame identifier "frame 2" associated with the web page 2 from the RAM 13, and reads the frame identifier "frame 1" of the parent frame associated with the frame identifier "frame 2" from the RAM 13 (S90). Subsequently, the CPU 12 reads the web page 1 from the RAM 13 because the web page 1 is a content associated with the frame identifier "frame 1".

The CPU 12 of the terminal device 10 searches in the web page 1 for the definition of the function "funcA( )" which is requested to be executed (S100). In this case, since the definition of the function "funcA( )" is not described on the web page 1, the CPU 12 reads the frame identifier "frame 1" associated with the web page 1 from the RAM 13, and reads the frame identifier "frame 0" of the parent frame associated with the read frame identifier "frame 1" from the RAM 13 (S105). Subsequently, the CPU 12 reads the web page 0 from the RAM 13 because the web page 0 is a content associated with the read frame identifier "frame 0" (S110).

The CPU 12 of the terminal device 10 searches in the web page 0 for the definition of the function "funcA( )" which is requested to be executed (S115). In this case, since the definition of the "funcA( )" is described as a common function on the web page 0, the CPU 12 performs predetermined processing based on the definition of the "funcA( )" as a common function on the web page 0 (S120).

In this manner, a function can be shared by a plurality of frames, and the definition of this function can be redefined and used independently on each frame as necessary.

Particularly, by commonizing an instance (entity) of a function, it is possible to share not only the function itself but also a variable used in this function. Accordingly, from respective application programs included in web pages displayed on frames, it is possible to access one function such as a function of a clip board feature. Furthermore, by sharing a value such as an attribution of a file among frames, it is possible to make cooperation between processes of application programs (scripts) included in web pages displayed on the frames (for example, drag-and-drop of a file or the like).

Embodiment 2

In this embodiment, only the structure of the web page 2 as a content is changed from Embodiment 1.

Figure 11:
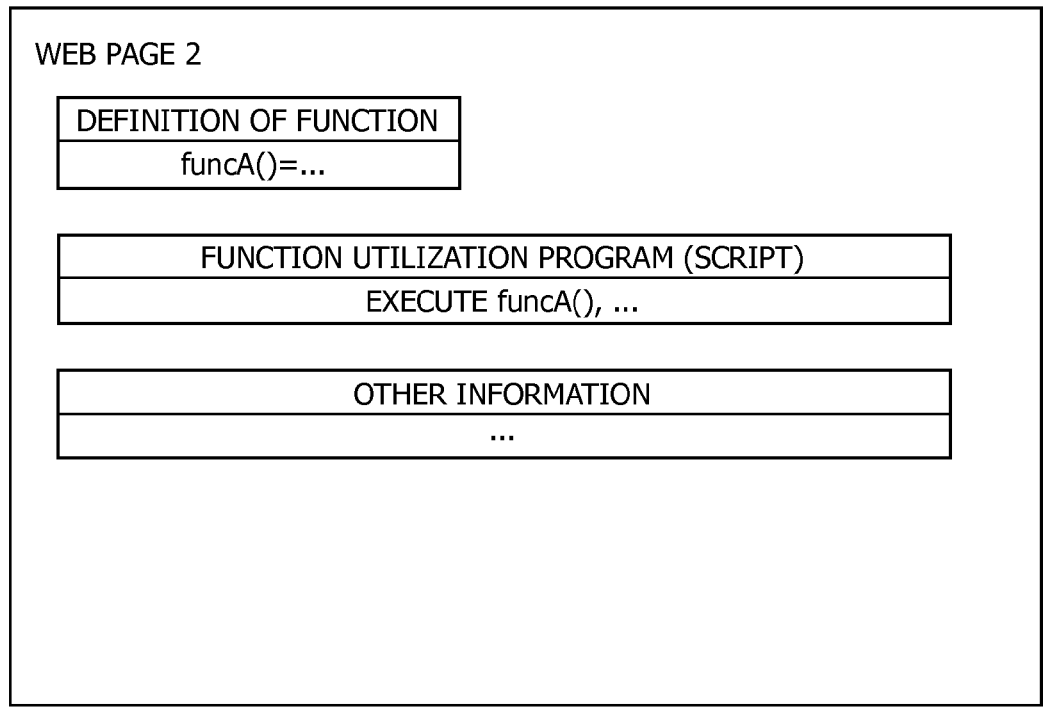
FIG. 11 is a structural diagram of a web page 2 (content) in Embodiment 2.

FIG. 11 is a structural diagram of the web page 2 as a content in this embodiment.

In the web page 2, described is the definition of a function "funcA( )" to be used in a program (script) included in this web page. Here, the name (function identifier) of the function "funcA( )" is the same as the name of the common function "funcA( )" in the above-described web page 0. Further, on the web page 2, a function utilization program is described. In this embodiment, the function utilization program is described in a predetermined script language such as JavaScript (registered trademark). The CPU 12 executes the predetermined function by executing the function utilization program via the web browser. Furthermore, on the web page 2, other information such as a text, an anchor, and so on constituting the web page are described.

In the following part, an operation of a computer system in this embodiment will be explained. However, operations of the terminal device 10 and the information providing system 20 when displaying a content are the same as in Embodiment 1, and hence explanation thereof is omitted.

Figure 12:
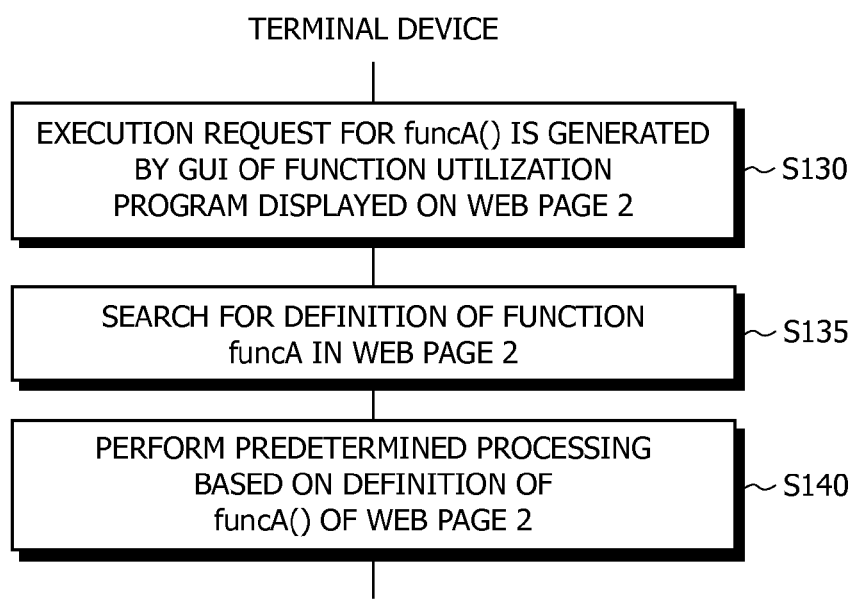
FIG. 12 is a flowchart showing an operation of the terminal device executing a function utilization program in Embodiment 2.

FIG. 12 is a flowchart showing an operation of the terminal device 10 executing the function utilization program in this embodiment.

The CPU 12 of the terminal device 10 detects that a predetermined button on the GUI of the function utilization program of the web page 2 displayed on the frame 2 is clicked by a user operation with the mouse. Accordingly, an execution request for the function "funcA( )" occurs (S130). Then, the CPU 12 searches in the web page 2 for the definition of the function "funcA( )" which is requested to be executed (S135). Here, since the definition of the function "funcA( )" is described on the web page 2, the CPU 12 performs predetermined processing based on the definition of the function "funcA( )" described in the web page 2 (S140).

In this manner, a function can be shared by a plurality of frames, and the definition of this function can be redefined and used independently on each frame as necessary.

Particularly, it becomes possible to control an operation of the terminal device based on an application program (script) included in a web page displayed on a frame by the definition of a function in a web page displayed on the frame or an ancestral frame of the frame.

In Embodiment 1 and Embodiment 2 above, the CPU 12 of the terminal device 10 receives a content from the external information providing system 20, but this content may be stored in advance in the HDD 19 of the terminal device 10. Information stored in the RAM 13 of the terminal device 10 in FIG. 9 may has been stored in advance in the HDD 19. Further, the content does not need to be a web page, and thus the function utilization program may be stored in the HDD 19 of the terminal device 10 separately from the content. Furthermore, also the definition of the function may be stored in advance in the HDD 19 of the terminal device 10 separately from the content.

As explained above, a function can be shared by a plurality of frames, and the definition of this function can be redefined and used independently for each frame as necessary.

Particularly, by commonizing an instance of a function, it is possible to share not only the function itself but also a variable used in this function. Accordingly, from respective application programs included in web pages displayed on frames, it is possible to access one function such as a function of a clip board feature. Furthermore, by sharing a value such as an attribution of a file among frames, it is possible to make cooperation between processes of application programs (scripts) included in web pages displayed on frames (for example, drag-and-drop of a file or the like).

Further, the definition of a function can be very large in its description amount. However, by storing the definition of a common function only on a web page which is displayed on the most ancestral frame, it is possible to lower the size of the web page including an application program (script) using this function, and functions can be managed in a unified manner.

Furthermore, in a web page to be displayed on a certain frame (window), the definition of a function regarding control of a frame (for example, arrangement of a frame, or the like) can be redefined to align frames regularly with DHTML (Dynamic HTML).

Example 1

Hereinafter, an example of the present invention will be explained. Here, the overall structure of the computer system is the same as in Embodiment 1 above, and hence explanation thereof is omitted.

FIG. 13 is a diagram showing a state that the CPU 12 of the terminal device 10 divides the screen of a web browser into three frames, a frame 0, a frame 1 and a frame 2, and displays a web page 0, a web page 1, and a web page 2 thereon respectively. Here, in the web page 0, the definitions of functions "

var g_n=0;
function set(v){g_n=v;}
function get( ){return g_n;}"

are described. Further, in each of the web page 1 and the web page 2, the aforementioned function utilization program is described. Furthermore, in the web page 1 and the web page 2, the definition of this function is not described. Then in the web page 0, by means of tags "<IFRAME>," a frame identifier "frame 1" and a content identifier "URL of web page 1" are described in association, and a frame identifier "frame 2" and a content identifier "URL of web page 2" are described in association.

The CPU 12 of the terminal device 10 associates the frame identifier "frame 0" with the "web page 0" as a content and stores them in the RAM 13 in the same manner as in Embodiment 1. More particularly, in the web page 0, the definitions of functions "

var g_n=0;
function set(v){g_n=v;}"
function get( ){return g_n;} are described. Thus, the CPU 12 associates the frame identifier "frame 0" with an instance of the function "set(v)" and stores them in the RAM 13, and associates the frame identifier "frame 0" with an instance of the function "get ( )" and stores them in the RAM 13. Further, the CPU 12 associates the frame identifier "frame 1" with the "web page 1" as a content and stores them in the RAM 13, and associates the frame identifier "frame 2" with the "web page 2" as a content and stores them in the RAM 13.

Further, the CPU 12 of the terminal device 10 identifies a parent-child relationship between the frames in the same manner as in Embodiment 1. In this example, the CPU 12 associates the frame identifier "frame 1" with the frame identifier "frame 0" of the parent frame, for which the frame 1 corresponding to the frame identifier "frame 1" is a child frame, and stores them in the RAM 13, and associates the frame identifier "frame 2" with the frame identifier "frame 0" of the parent frame, for which the frame 2 corresponding to the frame identifier "frame 2" is a child frame, and stores them in the RAM 13. FIG. 14 is a diagram conceptually showing information stored in the RAM 13 after the aforementioned processing.

When the Function Get( ) is Executed

The CPU 12 of the terminal device 10 detects that a predetermined button on the GUI of the function utilization program of the web page 1 displayed on the frame 1 is clicked by a user operation with the mouse. Accordingly, an execution request for the instance of the function "get( )" occurs. Then the CPU 12 executes the instance of the function "get( )" associated with the frame identifier "frame 0" in the same manner as in Embodiment 1, and obtains "0" as a return value of the function.

Similarly, the CPU 12 of the terminal device 10 detects that a predetermined button on the GUI of the function utilization program of the web page 2 displayed on the frame 2 is clicked by a user operation with the mouse. Accordingly, an execution request for the instance of the function "get( )" occurs. Then the CPU 12 executes the instance of the function "get( )" associated with the frame identifier "frame 0" in the same manner as in Embodiment 1, and obtains "0" as a return value of the function.

When the Function Get( ) is Executed after the Function Set(v) is Executed

The CPU 12 of the terminal device 10 detects that a predetermined button on the GUI of the function utilization program of the web page 1 displayed on the frame 1 is clicked by a user operation with the mouse. In this case, an execution request for the instance of the function "set(1)" occurs. Then the CPU 12 executes an instance of the function "set(1)" associated with the frame identifier "frame 0" in the same manner as in Embodiment 1. Accordingly, the CPU 12 designates the value of "g_n" to be a return value of the instance of the function "get( )" as "1", and associates the frame identifier "frame 0" with the instance of the function "get( )" and stores them in the RAM 13.

Subsequently, the CPU 12 of the terminal device 10 detects that a predetermined button on the GUI of the function utilization program of the web page displayed on either the frame 1 or the frame 2 is clicked by a user operation with the mouse. Accordingly, an execution request for the instance of the function "get( )" occurs. Then the CPU 12 executes the instance of the function "get( )" associated with the frame identifier "frame 0", and obtains "1" as a return value of the function in the same manner as in Embodiment 1.

In this manner, by commonizing the instance of a function, it is possible to share not only the function itself but also a variable used in this function. Thus, data between frames is shared easy.

Example 2

Hereinafter, another example of the present invention will be explained in detail. Here, the overall structure of the computer system is the same as in Embodiment 1 described above and hence explanation thereof is omitted.

Figure 15:
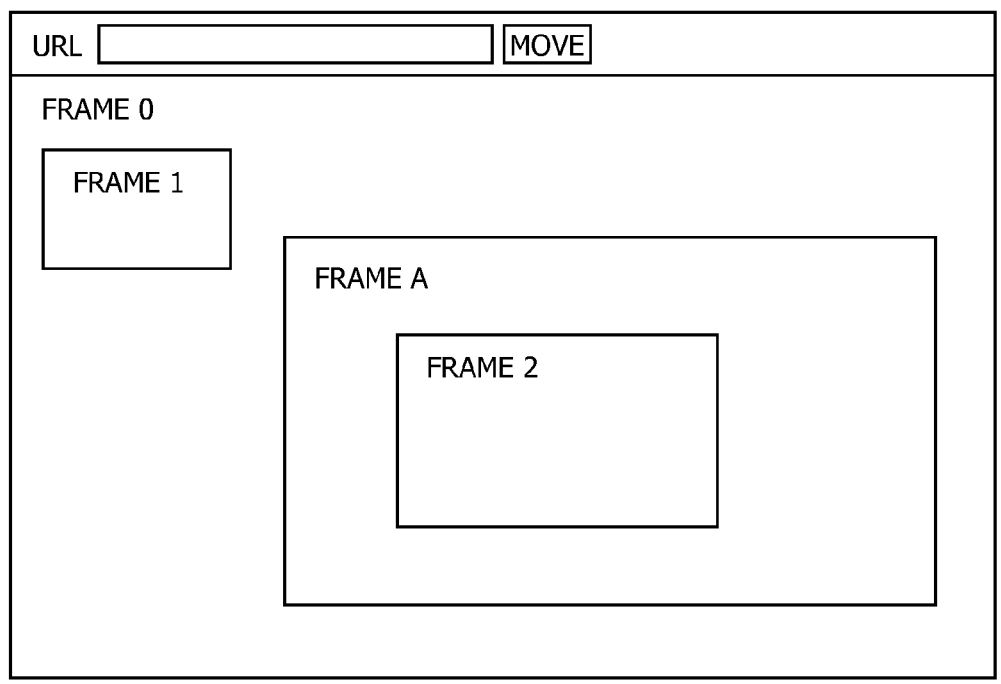
FIG. 15 is a diagram in which a web page 0, a web page 1, a web page 2, and a web page A are displayed on the screen of a web browser in Example 2.

FIG. 15 is a diagram showing a state that the CPU 12 of the terminal device 10 divides a screen of a web browser into four frames, a frame 0, a frame 1, a frame 2 and a frame A, and displays a web page 0, a web page 1, a web page 2 and a web page A thereon respectively.

Here, functions stored in the web page 0, the web page 1 and the web page 2 are the same as in Example 1, and hence explanation thereof is omitted. In the web page A, "function get( ){return=999}" is described as the definition of a function.

Further, on the web page 0, a frame identifier "frame 1" and a content identifier "URL of web page 1" are described in association, and a frame identifier "frame A" and a content identifier "URL of web page A" are described in association. Furthermore, in the web page A, a frame identifier "frame 2" and a content identifier "URL of web page 2" are described in association.

The CPU 12 of the terminal device 10 associates the frame identifier "frame 0" with the "web page 0" as a content and stores them in the RAM 13 in the same manner as in Embodiment 1. More particularly, on the web page 0, the definitions of functions "

var g_n=0;
function set(v){g_n=v;}
function get( ){return g_n;}"

are described. Thus, the CPU 12 associates the frame identifier "frame 0" with an instance of the function "set(v)" and stores them in the RAM 13, and associates the frame identifier "frame 0" with the instance of the function "get 0" and stores them in the RAM 13. Further, the CPU 12 associates the frame identifier "frame 1" with the "web page 1" as a content and stores them in the RAM 13, and associates the frame identifier "frame 2" with the "web page 2" as a content and stores them in the RAM 13. Furthermore, the CPU 12 associates the frame identifier "frame A" with the "web page A" as a content and stores them in the RAM 13. More particularly, since "function get( ){return=999}" is described on the web page A as the definition of a function, the CPU 12 associates the frame identifier "frame A" with the instance of the function "get( )" and stores them in the RAM 13.

Further, the CPU 12 of the terminal device 10 identifies a parent-child relationship between the frames in the same manner as in Embodiment 1. In this example, the CPU 12 of the terminal device 10 associates the frame identifier "frame 1" with the frame identifier "frame 0" of the parent frame, for which the frame 1 corresponding to the frame identifier "frame 1" is a child frame, and stores them in the RAM 13, and associates the frame identifier "frame 2" with the frame identifier "frame A" of the parent frame, for which the frame 2 corresponding to the frame identifier "frame 2" is a child frame, and stores them in the RAM 13. Furthermore, the CPU 12 associates the frame identifier "frame A" with the frame identifier "frame 0" of the parent frame, for which the frame A corresponding to the frame identifier "frame A" is a child frame, and stores them in the RAM 13. FIG. 16 is a diagram conceptually showing information stored in the RAM 13 after the aforementioned processing.

The CPU 12 of the terminal device 10 detects that a predetermined button on the GUI of the function utilization program of the web page 2 displayed on the frame 2 is clicked by a user operation with the mouse. Accordingly, an execution request for the instance of the function "get( )" occurs. Then the CPU 12 executes the instance of the function "get( )" associated with the frame identifier "frame A" in the same manner as in Embodiment 1, and obtains "999" as a return value of the function.

In this manner, without changing the web page 2 which is displayed on the frame 2, it is possible to control the operation of the terminal device 10 based on the function utilization program included in this web page by the definition of the function in the web page A which is displayed on the ancestral frame A.

Embodiment 3

A concrete example of a program (script) which searches for a function definition by tracing back to a parent frame in Embodiments 1, 2 described above will be explained. Here, JavaScript (registered trademark) is used as a script language.

In a content of a certain frame, the definition of a function execution function "exefunc" is described, which searches for and executes a function to be executed. An argument to the function execution function exefunc is a list of a function name of a function to be executed and an argument used in the function. The function execution function exefunc is a function for searching for a function having the function name that is specified in the argument with using a definition search function, and for executing the found function with the argument to the found function, which is specified in the argument of the function execution function exefunc.

The function execution function exefunc sets the function name of the function to be searched for to an argument of the definition search function, and the definition search function searches for the definition of the function with the function name in the content of each frame in order along a relationship between frames toward the parent frame of each frame.

In case that these functions are described with JavaScript (registered trademark), for example, in the definition search function, an element of a window object can be obtained by specifying the element name as an argument of an associative array of the window object. Thus, it is possible that the definition of a function can be obtained by specifying the function name of the function as an argument of the associative array of a window object. In this case, by confirming that there is an obtainable object and this object is a function, it is determined whether the function with the function name is defined or not in the instance (namely, in the content) of a window object displayed on a certain frame. When the function with the function name is not defined, it is determined whether or not the function with the function name is defined in the instance (namely, in the content) of a window object displayed on the parent frame. In this manner, when the definition of a function is not present in the content of a certain frame, it is checked in order whether the function is defined for the parent frame of this frame or not. In addition, with "parent" property of a window object, the instance of a window object of the parent frame can be identified. (Method 1)

Further, in case that these functions are described with JavaScript (registered trademark), for another example, in the definition search function, it is possible that, assuming that a function definition with a function name thereof exists in the instance of a window object for a certain frame, a character string specifying the function thereof is generated from the function name, and the character string is executed by an eval function. In this case, by executing the eval function, it is determined whether or not the function with the function name exists in the instance of the window object for the frame. If the function with the function name does not exist, a character string specifying the function thereof is generated from the function name under an assumption that a function definition with a function name thereof exists in the instance of a window object on the parent frame, and the character string is executed by the eval function so as to determine whether or not the function with the function name exists in the instance of the window object on the frame. In this manner, where the definition of a function is not present in the content of a certain frame, it is checked in order whether the function is defined for the parent frame of this frame or not. (Method 2)

In this method, where the content of a certain frame to search across frames for a certain function A and then execute the function, this function is not described as it is, but described is a function execution function "exefunc" (or a function including the function execution function exefunc)

in which the function and an argument for the function are specified as arguments. Accordingly, when the function execution function "exefunc" described in the program is executed, the definition of the function A is searched for, and the function A is executed based on the definition of the function A found in any one of the frames.

In JavaScript (registered trademark), regardless of whether an argument is explicitly defined or not in a function definition, it is possible to obtain an argument to be used in the function from an element of an array 'arguments' which has arguments to be passed implicitly. Thus, regarding arguments which are passed to the function to be executed, it is not necessary that the number of the arguments and the variable names of the arguments are fixed.

For example, by defining a function as follows in advance, all the arguments of the function f_A( ) takes values of the variable 'arguments' and are passed as arguments to the function execution function exefunc.

```
function f_A( ){
    exefunc("funcA", arguments);
}
```

Further, when the function takes arguments explicitly as follows, the same value as the 'arguments' used in the above function enters in the 'arguments'.

```
function f_A(a, b){
    exefunc("funcA", arguments);
}
```

In the examples, a function f_A(arg 1, arg2) is called instead of the function funcA(arg1, arg2) taking two arguments in order to execute a function funcA(arg1, arg2). Here, the arg1 and the arg2 are two arguments. When executing the function f_A(arg1, arg2), the function execution function searches for "funcA", and the function funcA(arg1, arg2) is executed based on the definition of the found function funcA. This function funcA is used as, for example, the function utilization program in Embodiments 1, 2.

As mentioned above, according to Embodiment 3, instead of a function to be executed, a function execution function "exefunc" is described in a content. The function "exefunc" takes arguments that are the function name of the function to be executed and an argument thereof. Then, by executing this function, a search for the definition of the function to be executed and execution of the function are performed.

In this manner, using JavaScript (registered trademark) or the like, a function can be executed in terms of a function definition described in the parent frame as described above.

Further, in Embodiment 3, JavaScript (registered trademark) is used. JavaScript (registered trademark) is a script language used in a content, and receives an argument implicitly and can use the argument in a function, regardless of whether the argument of the function is defined or not. Then, the definition of a function to call the function execution function exefunc is described in a content. Then, by executing the function execution function, a search for the definition of the function to be executed and execution of the function are performed. A function to call the function execution function receives an argument implicitly and specifies the argument explicitly to the function execution function when calling the function execution function.

Accordingly, since the implicitly received argument is passed to the function execution function explicitly, it is possible to pass an argument to various functions and execute a function by one function execution function, regardless of the number of arguments to be passed to the function to be executed.

Embodiment 4

Another application of the present invention will be disclosed and explained in a concrete example including display control information when displaying an HTML page on a web browser. This embodiment has differences from the aforementioned ones; for example, in this embodiment, it is possible to specify a window object at which the definition search function starts a search by means of an argument to the function execution function exefunc.

FIG. 17 is an example of a display control information (HTML) of a web page index.html corresponding to the web page 0 in Embodiment 1. In the web page 0, two functions, "funcC" and "funcE" are mounted. Further, a web page ko.html corresponding to the web page 1 in Embodiment 1 is called in an iFrame.

FIG. 18 is an example of display control information of the web page ko.html corresponding to the web page 1 in Embodiment 1. In the web page 1, two functions "funcA" and "funcB" are mounted. Further, a web page "mago.html" corresponding to the web page 2 in Embodiment 1 is called in an iFrame. However, a function "funcA" with the same name as the "funcA" is defined in the web page 2, and the function execution function is defined in the web page 2. Thus, it should be noted that the function "funcA" defined in the web page 1 is not executed as mentioned below, since the function execution function is defined in the web page 2.

FIG. 19 and FIG. 20 are examples of display control information of the web page mago.html corresponding to the web page 2 in Embodiment 1. In the web page 2, a function execution function "exefunc" and functions "f_A", "f_B", "f_C", "f_D" and "funcE" for calling the function execution function are mounted. The "f_A", "f_B", "f_C", "f_D", and "funcE" are each configured to be called by clicking an associated character string that is displayed when calling the web page 2 by the web browser. Further, on the web page 2, the "funcA" is mounted. Here, the function execution function takes arguments, which are a pointer to a window object where a search is started, the name of a function to be executed, and an array of arguments used when executing a found function.

Figure 21:
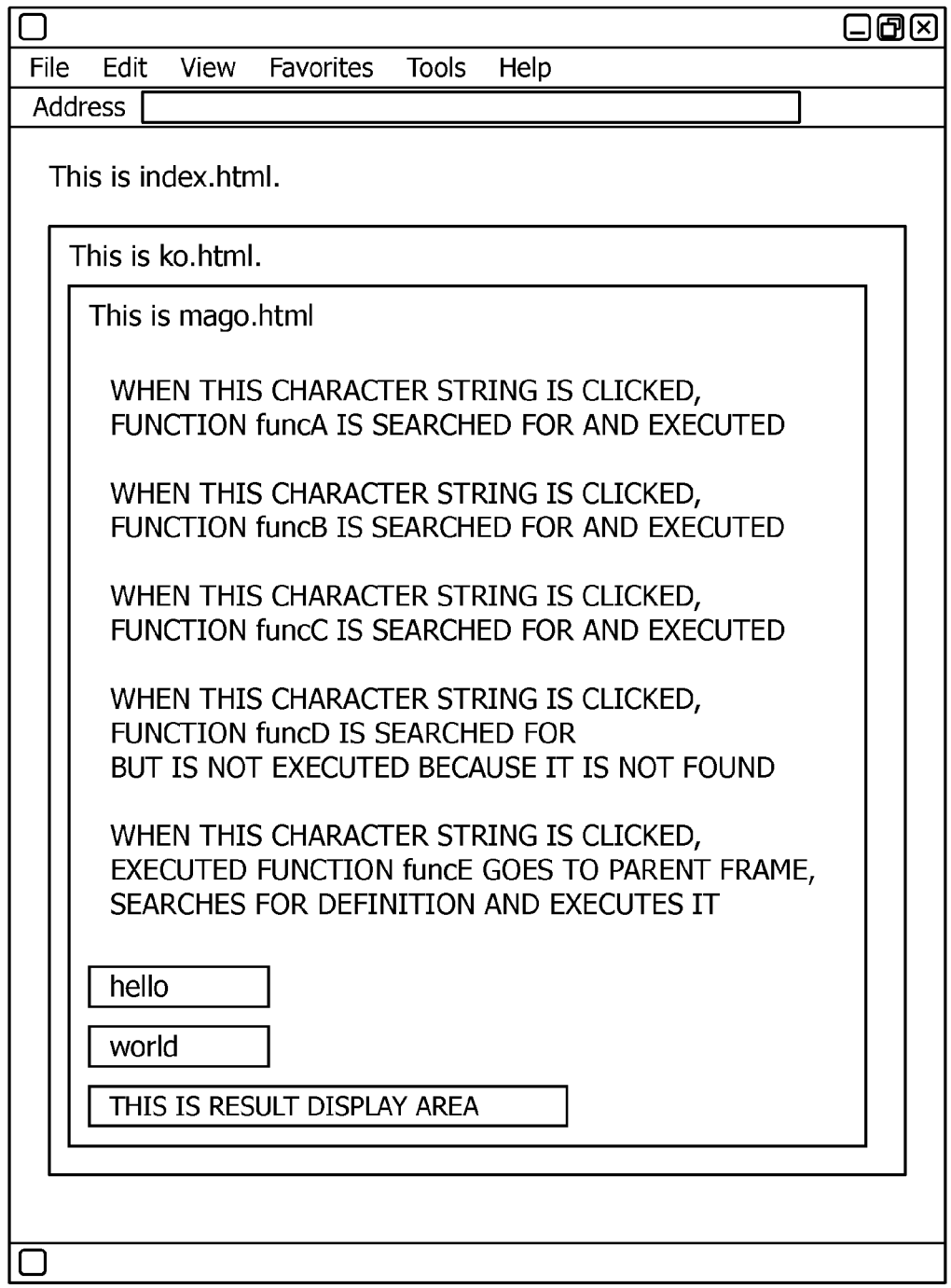
FIG. 21 is a diagram in which a web page 0, a web page 1, a web page 2, and a web page A are displayed on the screen of a web browser in Example 4.

As above, when the web page index.html is executed on the web browser, it provides a display content as shown in FIG. 21.

Embodiment 4-1

When a user of the terminal device operates a mouse pointer and clicks an appropriate character string, the function "f_A" is called. Here, the function "f_A" receives three arguments when called.

The function "f_A" executes the function execution function "exefunc". At this time, the function "f_A" does not specify a pointer to the window object as an argument, and passes the function name "funcA" and an argument 'arguments'; "funcA" is the function name of a function to be searched for and executed, and 'arguments' is an array of all the arguments implicitly passed and received in JavaScript (registered trademark) when the "f_A" is called.

The function execution function executes the definition search function with an argument being the name of the function. The definition search function searches in the window where this function itself is defined, for a function with the function name "funcA".

Specifically, the definition search function specifies the "funcA" as an argument of an associative array of the window object where this function itself is defined, so as to confirm the existence of "funcA." (Method 1)

Alternatively, the definition search function may use the eval function and execute eval("window.funcA") so as to confirm whether the function of interest is mounted or not. (Method 2)

Here, since the "funcA" is defined in the window object of the web page 2, the definition search function finds it and returns a pointer to the found function to the function execution function. The function execution function identifies the function to be executed using this pointer information and executes this function. Specifically, "apply" method defined in the JavaScript (registered trademark) is used. In the apply method, the second argument is set as an array that contains a list of arguments to be used in a function to be executed, and it is unfolded and used in the function to be executed. That is, the function execution function receives, as argAry, the argument 'arguments' that is an array containing three elements received by the function "f_A". Then the function execution function passes the argAry as it is as the second argument of the apply method in FIG. 19, and thus argAry[0] is passed and used as the first argument of the FuncA, argAry[1] as the second argument, and argAry[2] as the third argument.

In this manner, the function "funcA" found by the definition search function runs with arguments received by the function "f_A" as it is.

Embodiment 4-2

Next, an example will be explained, in which the function execution function executes a function located in a web page other than the web page in which the function execution function itself is defined.

When a user of the terminal device operates a mouse pointer and clicks an appropriate character string, the function "f_B" is called. Here, the function "f_B" receives two arguments when called.

The function "f_B" executes the function execution function "exefunc". At this time, the function "f_B" does not specify a pointer to the window object as an argument, and passes the function name "funcB" and an argument 'arguments'; "funcB" is the function name of a function to be searched for and executed, and 'arguments' is an array of all the arguments implicitly passed and received in JavaScript (registered trademark) when the "f_B" is called.

The function execution function executes the definition search function with an argument being the name of the function. The definition search function searches in the window where this function itself is defined, for a function with the function name "funcB". The method thereof is the same as in Embodiment 4-1.

However, here the "func_B" is not defined in the window object of the web page 2, and hence the definition search function cannot find the function in the web page 2. Therefore, the definition search function subsequently searches for a function with the function name "funcB" in the web page 1, which is the parent window. Specifically, the definition search function obtains a window object (window object of the web page 2) of a web page in which it searched for the function just previously, refers to ".parent" property therein to obtain a new window object (window object of the web page 1), and searches therein for the function "funcB" by a similar method (Method 1). Alternatively, the eval function may be used to execute eval("window.parent.funcB") so as to confirm whether the function of interest is mounted or not (Method 2). Here, "funcB" is defined in the window object of the web page 1, and thus the definition search function finds this and returns a pointer to the found function to the function execution function. The function execution function executes this function. The method thereof is similar to that in Embodiment 4-1.

Similarly, when the function "funcC" is executed in the web page 2, the definition search function cannot find the function of interest also in the web page 1. However, the definition search function obtains a window object (window object of the web page 1) of a web page in which it searched for the function just previously, refers to ".parent" property therein to obtain a new window object (window object of the web page 0), and searches therein for the function "funcC" by a similar method. Thus, the "funcC" can be found.

Further, when the definition search function cannot find the target function, it may inform the function execution function as a return value that the function cannot be found. The function execution function informs the user that the function cannot be found. For example, when the function "funcD" is executed on the web page 2, the definition search function returns null to the function execution function when it is confirmed that no further parent object exists.

Although here the "funcA" is defined in the web page 2 and the web page 0, it should be also noted that the function found and executed by the definition search function is the one defined in the web page 2, not the one defined in the web page 0.

Embodiment 4-3

In Embodiment 4-3, an example will be explained in which a window where a search is started is specified as a first argument to be passed to the function execution function exefunc. Further, an example will be explained in which a function obtains the function name of itself and passes it to the function execution function for causing the definition search function to search for and execute a function with the same name as itself, starting the search at another window.

When a user of the terminal device operates a mouse pointer and clicks an appropriate character string, the function "funcE" is called. Here, the function "funcE" calls the function execution function for executing a function "funcE" with the same name defined in another web page. Accordingly, the first argument specifies a window object of the web page to be the starting point of the search.

When the function execution function executes the definition search function, the definition search function starts the search at the window object specified by the first argument. Accordingly, one returned by the definition search function to the function execution function is not the function "funcE" defined in the web page 2, but the function "funcE" defined in the web page 0, which is found by a search starting at the web page 1.

Here, the first argument specifies the window object at which the search is started, and this window object is a web page in a direct parent-child relationship with a web page where the function itself executing the function execution function is defined, namely, "window.parent". However, by passing the "window.parent" as a character string, it is also possible for the definition search function, of course, to use the eval function to search for a function as the previously described "Method 2". Further, it is also possible to specify a window object of a web page that is not in a direct parent-child relationship, for example, a web page on the frame 1 in FIG. 15 of Example 1 may specify a window object of a web page on the frame 2 as a window object where the search begins.

Here, the function "funcE" converts the property "callee" of the arguments as a function property in JavaScript (registered trademark) into a character string, and obtains the function name of itself "funcE" from a portion between the character string "function" and "(". The "callee" method is mounted on some browsers such as Internet Explorer 6.0 (registered trademark).

Embodiment 5

In the following part, Embodiment 5 will be explained.

In Embodiment 5, an example is given in which the definition search function extends the range of searching for a function further to a web page in a child frame, and/or a web page in a child frame belonging to a parent frame, not only inside the web page in the parent frame. Further, other than the frame, this embodiment includes various cases in which parent-child relationships between web pages can be traced.

Figure 22:
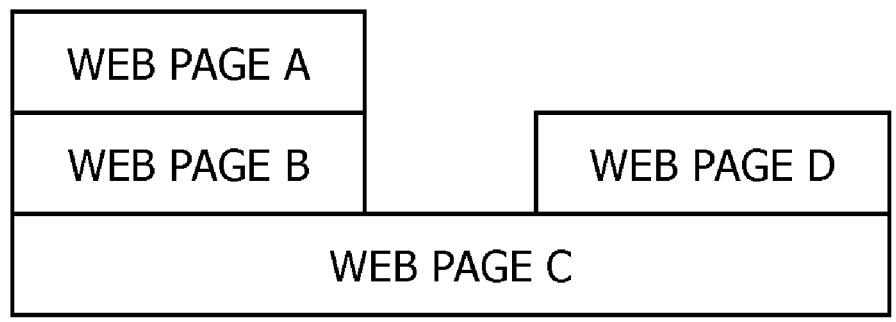
FIG. 22 is a diagram showing an example of a parent-child relationship of web pages.

FIG. 22 is a relationship diagram of a plurality of web pages formed on an HTTP client 112. In this figure, blocks stacked vertically show different web pages respectively. The vertically stacked web pages have a relationship such that a lower one is a parent (higher order) and an upper one is a child (lower order). In this embodiment, the following explanation is given assuming that programs executed by the web pages are described by JavaScript (registered trademark). Further, it is assumed that the function execution function includes the definition search function and is defined in the web page A.

The definition search function executed in a web page in which the function execution function is defined (for convenience of explanation, hereinafter referred to as a "start page") refers to parent-child relationships of web pages stored in the RAM, and selects a web page which can be found by tracing the parent or the parent of the parent from the start page. For convenience of explanation, hereinafter a web page selected here will be referred to as a "selected web page".

In the example of FIG. 22, the web page B and the web page C can be found by tracing parents in order from the start page, and hence they are to be selected. That is, web pages at higher orders from the start page are selected sequentially. A method of tracing the parent may be a method referring to "opener" property of a window object when a web page at a lower order is a new window opened from a web page at a higher order. Further, it may be a method to refer to "parent" property of a window object when a web page at a lower order is opened from a frame in a web page at a higher order.

The definition search function refers to a parent-child relationship stored in the RAM and searches for a function to be executed from the aforementioned selected web page and one or more web pages that can be found by tracing the parent or the parent of the parent from the selected web page. In addition, the definition search function refers to a parent-child relationship stored in the RAM and searches for a function to be executed in the aforementioned selected web page and one or more web pages that can be found by tracing a child or a child of a child from the selected web page.

In this embodiment, the parent-child relationship stored in the RAM means a parent-child relationship in a tree structure, which is one of data structures handled in information theories. A plurality of web pages in this parent-child relationship form nodes of this tree structure such as roots, branches, nodes, and leaves.

In this embodiment, the operation of finding a function to be executed by the definition search function is performed as follows for example.

In a web page where a function to be executed is defined, the function to be executed is mounted. This function is given, for example, an identifier name "funcname".

Before starting the search, the definition search function knows in advance that the identifier of the function to be executed is "funcname".

By checking the value of window.frames[n−1].funcname, the definition search function can find out whether a function with the identifier "funcname" is mounted or not on any frame object that is a child of the "window". Here, the "window" refers to the aforementioned selected web page. Further, "frames[n−1]" refers to an n-th frame object that is a child of the selected web page. The maximum value of n can be found as the value of windows.frames.length.

When the definition search function finds a function with the identifier "funcname" in a certain web page, it returns a pointer to this function to the function execution function.

On the other hand, when the definition search function cannot find a function with the function name "funcname", it repeats the processing to find the function "funcname" for a further child frame of the child frame which is examined this time. By checking the value of window.frames[n−1].frames[m−1].funcname, the definition search function can check the existence of the "funcname" function for a child frame that is lower by two generations. Here, the "frames[m−1]" refers to an m-th frame object that is a child of the frames[n−1]. For a child frame that is lower by three generations or more, similarly it is possible to check by concatenating 'frames' properties.

In this manner, when the function "funcname" cannot be found by tracing a child of a child from the selected web page, the definition search function selects the parent web page of the current web page as a new selected web page. As described above, by referring to "parent" property or the like, the parent web page can be found. Then, the definition search function finds whether a function with the identifier "funcname" is mounted in the new selected web page or not. If this function is not mounted in the new selected web page, the processing to search for the above "funcname" function is repeated. Further, when repeating the processing to search for the "funcname" function, it may be omitted to search for the "funcname" function on a frame where the function has already been searched for.

By repeating processing mentioned above, it is possible to search for the function "funcname" everywhere in all the web pages that can be obtained by referring to the tree structure from the start page.

Figure 23:
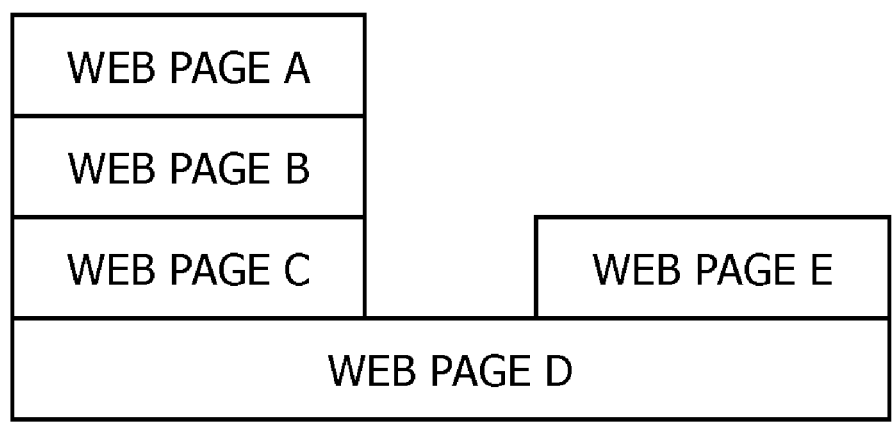
FIG. 23 is a diagram showing another example of a parent-child relationship of web pages.

As a result, in the example of FIG. 22, when the web page where the "funcname" is mounted is the web page D, the definition search function can find out that the identification information of a function to be executed is window.parent.parent.frames[0].funcname. Similarly, in the example of FIG. 23, if the web page where the "funcname" is mounted is the web page E, it finds that the identification information of the function to be executed is window.parent.parent.parent.frames[0].funcname. (However, either of the examples is the case where it is assumed that the index of a frame displaying a web page that has the function to be executed is zero.)

The definition search function can therefore pass a pointer to the function to the function execution function.

Here, in this embodiment, regarding a method of obtaining a child web page in a web page in a parent-child relationship, it has been explained the case where the child web page is on a parent frame generated on a parent web page. However, in case that the child web page is started as a new window, for example, a pointer to the child window is generated by means of JavaScript (registered trademark) of the parent window when generating this new window, and if the parent window is a web page displaying a content of the same domain as the child window, the definition search function can obtain the pointer information of interest. Based on this, the function or the like defined in the web page of this child window can be obtained via the parent window. As a matter of course, whether each web page is displayed or not displayed is not questioned. Further, a method of searching the tree is not limited to the method mentioned in the embodiments, and various search methods can be adopted.

It should be noted that, although the above embodiments are preferable examples of the present invention, the present invention is not limited to them. Various modifications and changes are possible within the range not departing from the spirit of the present invention.

For example, the search condition of a function used in the definition search function may include not only a function name thereof but also another factor, that is, whether this function is equipped with a predetermined property or method or not; and if a predetermined property or method is not mounted, it may continue the search for definition on another web page; and if only a part of a property or method which must be possessed by the target function is mounted on the found function, it may also obtain or execute an obtainable or executable part and search for the rest of the property or method in another web page.

The function execution function and/or the definition search function can be defined in a function which tries to execute these functions.

Further, it is also possible to execute a method using a combination of the above-described examples. The function execution function, the definition search function and a function to be found by the definition search function are not limited to a function defined in JavaScript (registered trademark), and they may also be one defined in ActionScript (registered trademark) or the like. The search target of the definition search function is not limited to a function, and may be a predetermined variable or a DOM object.

Having described the present invention including various features and variations thereof, it is intended that the appended claims be interpreted as including the embodiments described herein, the alternatives mentioned above, and all equivalents thereto.

What is claimed is:

1. A method of using a function of which a definition is described in anyone of a plurality of contents associated with a plurality of frames having a parent-child relationship, the method comprising the steps of:
when an execution request for a predetermined function occurs when a content associated with a certain frame is executed, searching in the content for a definition of the function for which execution is requested;
when the definition of the function is not found in the content, searching for the definition of the function until the definition of the function is found in a content associated with a parent frame of the frame associated with the definition has not been found; and
when the definition of the function is found, executing predetermined processing based on the found definition of the function, wherein:
the content includes a program described in a script language;
the definition of the function is described in the program;
a function execution function, which takes a function name of a function to be executed and an argument thereof as arguments, is executed so as to search for the function to be executed and execute the function; and
the function execution function is a function which searches for a definition of a function based on the function name specified as an argument, and executes the function to be executed with an argument according to the found definition of the function.

2. The method of using a function according to claim 1, further comprising the steps of:
associating a frame identifier identifying a frame and a content associated with the frame, and storing them in a predetermined storage device; and
associating the frame identifier and a frame identifier of a parent frame of the frame with the frame identifier, and storing them in the predetermined storage device, wherein when identifying the content associated with the parent frame of the frame associated with the definition has not been found, a frame identifier of the parent frame is associated is identified, and a content associated with the frame identifier is identified as the content associated with the parent frame.

3. The method of using a function according to claim 1, wherein:
the script language is a language allowing to implicitly receive an argument without the definition of the argument of the function and to use the argument in a function;
the function executing function is executed by executing a function to call the function execution function so as to search for the function to be executed and execute the function; and
the function to call the function execution function is a function which receives an argument implicitly and specifies an argument of the function execution function explicitly as the implicitly received argument when the function execution function is called.

4. A method of using a function of which a definition is described in anyone of a plurality of contents associated with a plurality of frames having a parent-child relationship, the method comprising the steps of:
when an execution request for a predetermined function occurs when a content associated with a certain frame is executed, searching in the content for a definition of the function for which execution is requested;
when the definition of the function is not found in the content, searching for the definition of the function until the definition of the function is found in a content associated with parent frame of the frame associated with the definition has not been found; and
when the definition of the function is found, executing predetermined processing based on the found definition of the function, wherein:
the content has an external file including a program described in a script language;
the definition of the function is described in the program;
the definition of the function is searched for in the external file;
a function execution function, which takes a function name of a function to be executed and an argument thereof as arguments, is executed so as to search for the function to be executed and execute the function; and the function execution function is a function to search for a definition of a function based on the function name specified as an argument, and execute the function to be executed with an argument according to the found definition of the function.

5. The method of using a function according to claim 4, wherein:
the script language is a language allowing to implicitly receive an argument without the definition of the argument of the function and to use the argument in a function;
the function executing function is executed by executing a function to call the function execution function so as to search for the function to be executed and execute the function; and
the function to call the function execution function is a function which receives an argument implicitly and specifies an argument of the function execution function explicitly as the implicitly received argument when the function execution function is called.

6. The method of using a function according to claim 4, further comprising the steps of:
associating a frame identifier identifying a frame and a content associated with the frame, and storing them in a predetermined storage device; and
associating the frame identifier and a frame identifier of a parent frame of the frame with the frame identifier, and storing them in the predetermined storage device, wherein when identifying the content associated with the parent frame of the frame associated with the definition has not been found, a frame identifier of the parent frame is associated is identified, and a content associated with the frame identifier is identified as the content associated with the parent frame.

7. A non-transitory computer readable recording medium recording a function utilization program using a function described in anyone of a plurality of contents associated with a plurality of frames having a parent-child relationship, a definition of the program being defined in one of the contents, wherein when the function utilization program is executed by a processor, the processor executes the steps of:
when an execution request for a predetermined function occurs when a content associated with a certain frame is executed, searching in the content for a definition of the function for which execution is requested;
when the definition of the function is not found in the content, searching for the definition of the function until the definition of the function is found in a content associated with a parent frame of the frame associated with the content in which the definition has not been found; and
when the definition of the function is found, executing predetermined processing based on the found definition of the function, wherein:
the content includes a program described in a script language;
the definition of the function is described in the program;
a function execution function, which takes a function name of a function to be executed and an argument thereof as arguments, is executed so as to search for the function to be executed and execute the function; and
the function execution function is a function which searches for a definition of a function based on the function name specified as an argument, and executes the function to be executed with an argument according to the found definition of function.

8. The non-transitory computer readable recording medium according to claim 7, wherein:
the script language is a language allowing to implicitly receive an argument without the definition of the argument of the function and to use the argument in a function;
the function executing function is executed by executing a function to call the function execution function so as to search for the function to be executed and execute the function; and
the function to call the function execution function is a function which receives an argument implicitly and specifies an argument of the function execution function explicitly as the implicitly received argument when the function execution function is called.

9. The non-transitory computer readable recording medium according to claim 7, wherein the processor further executes the steps of:
associating a frame identifier identifying a frame and a content associated with the frame, and storing them in a predetermined storage device; and
associating the frame identifier and a frame identifier of a parent frame of the frame with the frame identifier, and storing them in the predetermined storage device, wherein when identifying the content associated with the parent frame of the frame associated with the definition has not been found, a frame identifier of the parent frame is associated is identified, and a content associated with the frame identifier is identified as the content associated with the parent frame.

10. A non-transitory computer readable recording medium recording a function utilization program using a function described in anyone of a plurality of contents associated with a plurality of frames having a parent-child relationship, a definition of the program being defined in one of the contents, wherein when the function utilization program is executed by a processor, the processor executes the steps of:
when an execution request for a predetermined function occurs when a content associated with a certain frame is executed, searching in the content for a definition of the function for which execution is requested;
when the definition of the function is not found in the content, searching for the definition of the function until the definition of the function is found in a content associated with a parent frame of the frame associated with the content in which the definition has not been found; and
when the definition of the function is found, executing predetermined processing based on the found definition of the function, wherein:
the content has an external file including a program described in a script language;
the definition of the function is described in the program;
the definition of the function is searched for in the external file;
a function execution function, which takes a function name of a function to be executed and an argument thereof as arguments, is executed so as to search for the function to be executed and execute the function; and
the function execution function is a function to search for a definition of a function based on the function name specified as an argument, and execute the function to be executed with an argument according to the found definition of the function.

11. The non-transitory computer readable recording medium according to claim 10, wherein:

the script language is a language allowing to implicitly receive an argument without the definition of the argument of the function and to use the argument in a function;

the function executing function is executed by executing a function to call the function execution function so as to search for the function to be executed and execute the function; and the function to call the function execution function is a function which receives an argument implicitly and specifies an argument of the function execution function explicitly as the implicitly received argument when the function execution function is called.

12. The non-transitory computer readable recording medium according to claim 10, wherein the processor further executes the steps of:

associating a frame identifier identifying a frame and a content associated with the frame, and storing them in a predetermined storage device; and associating the frame identifier and a frame identifier of a parent frame of the frame with the frame identifier, and storing them in the predetermined storage device, wherein when identifying the content associated with the parent frame of the frame associated with the definition has not been found, a frame identifier of the parent frame is associated is identified, and a content associated with the frame identifier is identified as the content associated with the parent frame.

* * * * *